(12) United States Patent
Liang et al.

(10) Patent No.: US 11,326,092 B2
(45) Date of Patent: May 10, 2022

(54) HIGH TEMPERATURE CROSS-LINKED FRACTURING FLUIDS WITH REDUCED FRICTION

(71) Applicant: Saudi Arabian Oil Company, Dhahran (SA)

(72) Inventors: Feng Liang, Cypress, TX (US); Jose I. Rueda, Dhahran (SA); Nam Mai, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/001,479

(22) Filed: Aug. 24, 2020

(65) Prior Publication Data

US 2022/0056332 A1    Feb. 24, 2022

(51) Int. Cl.
    *C09K 8/68*    (2006.01)
    *E21B 43/26*   (2006.01)

(52) U.S. Cl.
    CPC .................... *C09K 8/685* (2013.01)

(58) Field of Classification Search
    CPC ................ C09K 8/685; E21B 43/26
    USPC ........................................ 166/308
    See application file for complete search history.

(56) References Cited

U.S. PATENT DOCUMENTS

| | | |
|---|---|---|
| 2,649,710 A | 8/1953 | Dale |
| 2,706,406 A | 4/1955 | Vincent et al. |
| 2,801,698 A | 8/1957 | Bond |
| 3,066,739 A | 12/1962 | Saurenman et al. |
| 3,176,511 A | 4/1965 | Widmyer |
| 3,789,217 A | 1/1974 | Youmans |
| 3,875,606 A | 4/1975 | Landers |
| 3,938,594 A | 2/1976 | Rhudy et al. |
| 4,137,182 A | 1/1979 | Golinkin |
| 4,389,461 A | 6/1983 | Scott |
| 4,452,076 A | 6/1984 | Gavignet et al. |
| 4,665,982 A | 5/1987 | Brown |
| 4,665,990 A | 5/1987 | Perlman |
| 4,745,139 A | 5/1988 | Haasl et al. |
| 4,749,038 A | 6/1988 | Shelley et al. |
| 4,780,223 A | 10/1988 | Baranet et al. |
| 4,800,752 A | 1/1989 | Piers |

(Continued)

FOREIGN PATENT DOCUMENTS

| AU | 2014278762 | 9/2015 |
|---|---|---|
| CN | 103387827 | 11/2013 |

(Continued)

OTHER PUBLICATIONS

Cheng et al., "Cotton aerogels and cotton-cellulose aerogels from environmental waste for oil spillage cleanup," Materials & Design, Elsevier, 130:452-458, May 28, 2017, 7 pages.

(Continued)

*Primary Examiner* — Zakiya W Bates
*Assistant Examiner* — Ashish K Varma
(74) *Attorney, Agent, or Firm* — Fish & Richardson P.C.

(57) ABSTRACT

Hybrid fracturing fluids for treating subterranean formations are provided. An exemplary hybrid fracturing fluid includes a mixture of an aqueous copolymer composition including a crosslinkable polymer (CLP), the CLP including crosslinking sites. The mixture also includes a crosslinker for the crosslinking sites, and a friction reducing polymer (FRP).

23 Claims, 4 Drawing Sheets

(56) References Cited

U.S. PATENT DOCUMENTS

| | | |
|---|---|---|
| 5,007,481 A | 4/1991 | Williams et al. |
| 5,256,315 A | 10/1993 | Lockhart |
| 5,293,905 A | 3/1994 | Friedrich |
| 5,586,027 A | 12/1996 | Carlson et al. |
| 5,661,237 A | 8/1997 | Dussan et al. |
| 5,831,177 A | 11/1998 | Waid et al. |
| 6,119,777 A | 9/2000 | Runia |
| 6,121,336 A | 9/2000 | Okoroafor et al. |
| 6,176,315 B1 | 1/2001 | Reddy et al. |
| 6,227,295 B1 | 5/2001 | Mitchell et al. |
| 6,263,729 B1 | 7/2001 | Catala |
| 6,478,971 B1 | 11/2002 | Koefod et al. |
| 6,613,720 B1 | 9/2003 | Feraud et al. |
| 6,663,778 B1 | 12/2003 | Bader |
| 6,747,270 B2 | 6/2004 | Pereira et al. |
| 6,776,054 B1 | 8/2004 | Stephenson et al. |
| 6,986,391 B2 | 1/2006 | Funkhouser et al. |
| 7,093,663 B1 | 8/2006 | Bader |
| 7,198,722 B2 | 4/2007 | Hussain |
| 7,703,531 B2 | 4/2010 | Huang |
| 7,806,182 B2 | 10/2010 | Waters et al. |
| 7,845,409 B2 | 12/2010 | Shinbach et al. |
| 7,886,826 B2 | 2/2011 | Robinson et al. |
| 7,933,018 B2 | 4/2011 | Vannuffelen et al. |
| 8,003,577 B2 | 8/2011 | Li et al. |
| 8,012,358 B2 | 9/2011 | Salbaugh et al. |
| 8,309,498 B2 | 11/2012 | Funkhouser et al. |
| 8,450,252 B2 | 5/2013 | Funkhouser et al. |
| 8,573,302 B2 | 11/2013 | Robb et al. |
| 8,584,755 B2 | 11/2013 | Willberg |
| 8,815,096 B2 | 8/2014 | Zuback et al. |
| 8,822,386 B2 | 9/2014 | Quintero et al. |
| 8,834,726 B2 | 9/2014 | Keister |
| 8,835,363 B2 | 9/2014 | Amanullah et al. |
| 9,006,151 B2 | 4/2015 | Amanullah et al. |
| 9,034,802 B2 | 5/2015 | Ahrenst et al. |
| 9,085,477 B2 | 7/2015 | Banerjee et al. |
| 9,266,754 B2 | 2/2016 | Fazrie et al. |
| 9,453,156 B2 | 9/2016 | Wu |
| 9,611,416 B2 | 4/2017 | Wang et al. |
| 9,896,919 B1 | 2/2018 | Chen et al. |
| 10,047,281 B2 | 8/2018 | Nguyen |
| 10,144,866 B2 | 12/2018 | Liang |
| 10,442,980 B2 | 10/2019 | Li |
| 10,501,680 B2 | 12/2019 | Li et al. |
| 2003/0209248 A1 | 11/2003 | Ward |
| 2004/0003905 A1 | 2/2004 | Shinbach et al. |
| 2004/0211568 A1 | 10/2004 | Funkhouser et al. |
| 2005/0016732 A1 | 1/2005 | Brannon |
| 2005/0039919 A1 | 2/2005 | Harris et al. |
| 2005/0059558 A1 | 3/2005 | Blanch |
| 2006/0234871 A1 | 10/2006 | Dalrymple et al. |
| 2007/0054054 A1 | 3/2007 | Svoboda et al. |
| 2008/0093073 A1 | 4/2008 | Bustos et al. |
| 2008/0103068 A1 | 5/2008 | Parris |
| 2008/0234147 A1 | 9/2008 | Li et al. |
| 2009/0032252 A1 | 2/2009 | Boney et al. |
| 2009/0095469 A1 | 4/2009 | Dozier |
| 2009/0242196 A1 | 10/2009 | Pao |
| 2009/0277634 A1 | 11/2009 | Case |
| 2009/0283257 A1 | 11/2009 | Becker |
| 2010/0048430 A1 | 2/2010 | Funkhouser et al. |
| 2010/0243242 A1 | 9/2010 | Boney et al. |
| 2010/0263867 A1 | 10/2010 | Horton et al. |
| 2011/0083849 A1 | 4/2011 | Medvedev |
| 2012/0006551 A1 | 1/2012 | Carman et al. |
| 2012/0018159 A1 | 1/2012 | Gulta et al. |
| 2012/0129737 A1 | 5/2012 | Lesko et al. |
| 2012/0205313 A1 | 8/2012 | Sathrugnan et al. |
| 2012/0261129 A1 | 10/2012 | Becker |
| 2012/0267102 A1 | 10/2012 | Huang et al. |
| 2012/0318498 A1 | 12/2012 | Parsche |
| 2013/0025867 A1 | 1/2013 | Sun et al. |
| 2013/0048562 A1 | 2/2013 | Keister |
| 2013/0118740 A1 | 5/2013 | Sherman et al. |
| 2013/0118744 A1 | 5/2013 | Gamage |
| 2013/0213638 A1 | 8/2013 | Keller |
| 2013/0290064 A1 | 10/2013 | Altamirano et al. |
| 2014/0027109 A1 | 1/2014 | Al-Baraik |
| 2014/0096964 A1 | 4/2014 | Chakraborty et al. |
| 2014/0158632 A1 | 6/2014 | Govind et al. |
| 2014/0221257 A1 | 8/2014 | Roddy |
| 2014/0353042 A1 | 12/2014 | Karale et al. |
| 2014/0364343 A1 | 12/2014 | Nelson et al. |
| 2014/0367111 A1 | 12/2014 | Gamage |
| 2015/0039919 A1 | 2/2015 | Lim et al. |
| 2015/0057097 A1 | 2/2015 | Cho |
| 2015/0057196 A1* | 2/2015 | Debord .............. C09K 8/685 |
| | | 507/213 |
| 2015/0065398 A1 | 3/2015 | Gartland et al. |
| 2015/0072902 A1 | 3/2015 | Lafitte et al. |
| 2015/0083420 A1 | 3/2015 | Gupta et al. |
| 2015/0083669 A1 | 3/2015 | Matherly et al. |
| 2015/0167440 A1 | 6/2015 | Kasevich |
| 2015/0192005 A1 | 7/2015 | Saeedfar |
| 2015/0284625 A1 | 10/2015 | Silveira |
| 2015/0322759 A1 | 11/2015 | Okoniewski |
| 2016/0024367 A1 | 1/2016 | Zha |
| 2016/0060504 A1* | 3/2016 | Dawson .............. C09K 8/602 |
| | | 166/300 |
| 2016/0130496 A1 | 5/2016 | Holtsclaw et al. |
| 2016/0154133 A1 | 6/2016 | Donderici et al. |
| 2016/0215205 A1 | 7/2016 | Nguyen |
| 2016/0319187 A1 | 11/2016 | Lawrence et al. |
| 2016/0376494 A1* | 12/2016 | Li .............. C09K 8/887 |
| | | 166/308.5 |
| 2017/0015895 A1 | 1/2017 | Cox |
| 2017/0145303 A1 | 5/2017 | Fontenelle et al. |
| 2017/0197853 A1 | 7/2017 | Chudasama et al. |
| 2017/0198207 A1 | 7/2017 | Li et al. |
| 2018/0155602 A1 | 6/2018 | Zhang |
| 2018/0282616 A1 | 10/2018 | Debord et al. |
| 2019/0062619 A1* | 2/2019 | Li .............. C09K 8/887 |
| 2019/0100692 A1 | 4/2019 | Deysarkar et al. |

FOREIGN PATENT DOCUMENTS

| | | |
|---|---|---|
| EP | 0805260 | 11/1997 |
| JP | 2014196444 | 10/2014 |
| WO | WO 2003025340 | 3/2003 |
| WO | WO 2004061046 | 7/2004 |
| WO | WO 2005080012 | 9/2005 |
| WO | WO 2012057910 | 5/2012 |
| WO | WO 2012087887 | 6/2012 |
| WO | WO 2012122505 | 9/2012 |
| WO | WO 2013041633 | 3/2013 |
| WO | WO 2013052359 | 4/2013 |
| WO | WO 2013155061 | 10/2013 |
| WO | WO 2014008598 | 1/2014 |
| WO | WO 2014123672 | 8/2014 |
| WO | WO 2014190226 | 11/2014 |
| WO | WO 2014200611 | 12/2014 |
| WO | WO 2015103096 | 7/2015 |
| WO | WO 2016163983 | 10/2016 |
| WO | WO 2016182553 | 11/2016 |
| WO | WO 2016201445 | 12/2016 |
| WO | WO 2017049039 | 3/2017 |
| WO | WO 2017096055 | 6/2017 |
| WO | WO 2018025010 | 2/2018 |

OTHER PUBLICATIONS

Drdlova et al., "Effect of Nanoparticle Modification on Static and Dynamic Behavior of Foam Based Blast Engergy Absorbers," Cellular Polymers, 35:3, May 2016, 16 pages.

Forni et al., "Conditioning Pre-existing Old Vertical Wells to Stimulate and Test Vaca Muerta Shale Productivity through the Application of Pinpoint Completion Techniques," SPE-172724-MS, Society of Petroleum Engineers (SPE), presented at the SPE Middle East Oil and Gas Show, Mar. 8-11, 2015, 28 pages.

Funkhouser and Norman, "Synthetic Polymer Fracturing Fluid for High-Temperature Application," International Symposium on Oilfield (56) References Cited

OTHER PUBLICATIONS

Chemistry, Society of Petroleum Engineers, SPE 80236, Feb. 5-7, 2003, 6 pages.
Gaillard et al., "Novel Associative Acrylamide-based Polymers for Proppant Transport in Hydraulic Fracturing Fluids," SPE International Symposium on Oilfield Chemistry, Society of Petroleum Engineers, SPE 164072, Apr. 8-10, 2013, 11 pages.
George et al., "Approximate relationship between frequency-dependent skin depth resolved from geoelectronnagnetic pedotransfer function and depth of investigation resolved from geoelectrical measurements: A case study of coastal formation, Southern Nigeria," J. Earth Syst. Sci., 1379-1390, Oct. 2016, 12 pages.
Gupta and Carman, "Fracturing Fluid for Extreme Temperature Conditions is Just as Easy as the Rest," SPE Hydraulic Fracturing Technology Conference, Society of Petroleum Engineers, SPE 140176-MS, Jan. 24-26, 2011, 5 pages.
Gurav et al., "Silica Aerogel: Synthesis and Applications," Journal of Nanomaterials, Hindawi Publishing Corporation, 2010:409310, Jan. 1, 2010, 11 pages.
Han and Cundall, "LBM-DEM modeling of fluid-solid internation in porous media," International Journal for Numerical and Analytical Methods in Geomechanics, 37:10 (1391-1407), Jul. 2013, 17 pages.
Hunt et al., "Kinetics of the gelation of colloidal silica at geothermal conditions and implications for reservoir modification and management," SGP-TR-198, proceedings of the Thirty-Eighth Workshop on Geothermal Reservoir Engineering, Jan. 2013, 10 pages.
itascacg.com [online], "Particle Flow Code, Version 5.0," Itasca Consulting Group, Inc., available on or before Apr. 11, 2014, [retrieved on May 11, 2018], retrieved from URL: <https://www.itascacg.com/software/pfc>, 5 pages.
Jiantaol and Bingcheng, "Development of Silica Aerogel and Hollow Glass Microspheres Based Heat-Insulating Coatings," Paint & Coatings Industry, Jul. 1, 2013, 1 page, abstract only.
Keivani et al., "Synergistic Toughening in Ternary Silica/Hallow Glass Spheres/Epoxy Nanocomposites," Polymer-Plastics Technology and Engineering, 54:6 (581-593), Dec. 10, 2014, 14 pages.
Lai et al., "Experimental Investigation on Brazilian Tensile Strength of Organic-rich Gas Shale," SPE-177644-MS, Society of Petroleum Engineers (SPE), presented at the Abu Dhabi International Petroleum Exhibition and Conference, Nov. 9-12, 2015, 24 pages.
Li et al., "High-Temperature Fracturing Fluids Using Produced Water with Extremely High TDS and Hardness," IPTC-17797-MS, International Petroleum Technology Conference (IPTC), presented at the International Petroleum Technology Conference, Dec. 10-12, 2014, 13 pages.
Li et al., "Well Treatment Fluids Prepared With Oilfield Produced Water: Part II," SPE-133379-MS, Society of Petroleum Engineers (SPE), presented at the SPE Annual Technical Conference and Exhibition, Sep. 19-22, 2010, 7 pages.
Liang et al., "An Experimental Study on interactions between Imbibed Fractured Fluid and Organic-Rich Tight Carbonate Source Rocks," SPE-188338-MS, Society of Petroleum Engineers (SPE), presented at the Abu Dhabi International Petroleum Exhibition and Conference, Nov. 13-16, 2017, 14 pages.
Magryta, "Effect of Aerogel on the Properties of Acrylonitrile-butadiene rubber (NBR) Vulcanizates," Polimer, 57:2, Feb. 1, 2012, 7 pages, English summary.
Maleki et al., "An overview on silica aerogels synthesis and different mechanical reinforcing strategies," Journal of Non-Crystalline Solids, 385: 55-74, Feb. 1, 2014, 20 pages.
McMahon et al., "First 100% Reuse of Bakken Produced Water in Hybrid Treatments Using Inexpensive Polysaccharide Gelling Agents," SPE-173783-MS, Society of Petroleum Engineers (SPE), presented at the SPE International Symposium on Oilfield Chemistry, Apr. 13-15, 2015, 9 pages.
Mutua et al., "Surface Modification of Hollow Glass Microspheres," Materials Sciences and Applications, 3:856-860, Dec. 2012, 5 pages.
Pojanavaraphan et al., "Solution Cross-Linked Natural Rubber (NR)/Clay Aerogel Composites," Macromolecules, 44:4 (923-931), Feb. 22, 2011, 9 pages.
Rotaru et al., "Performances of clay aerogel polymer composites for oil spill sorption: Experimental design and modeling," Separation and Purification Technology, 133:260-275, Jul. 11, 2014, 16 pages.
Shi et al., "Superhydrophobic silica aerogels reinforced with polyacrylonitrile fibers for adsorbing oil from water and oil mixtures," RSC Advances 7:7 (4039), Jan. 1, 2017, 7 pages.
Wang et al., "Ultralow Electrical Percolation in Graphene Aerogel/Epoxy Composites," Chemistry of Materials, 28:18 (6731-6741), Sep. 7, 2016, 11 pages.
Waters, "Frac Fluids on Organic Shales: What We Know, What We Don't, and What Can We Do About It," Society of Petroleum Engineers (SPE), Asia Pacific Hydraulic Fracturing Conference, Aug. 24-26, 2016, Beijing, China, 29 pages.
Yaich et al., "A Case Study: The Impact of Soaking on Well Performance in the Marcellus," URTeC: 2154766, presented at the Unconventional Resources Technology Conference, Jul. 20-22, 2015, 1 page.
Zielinska, "Swelling of EPDM rubbers for oil-well applications as influenced by medium composition and temperature," pecznienie uszczelnien z EPDM, Elastomery, 2:20, Jan. 2016, 12 pages.
Zuo et al., "Polymer/Carbon-Based Hybrid Aerogels: Preparation, Properties and Applications," Materials, 8:10 (6806-6848), Oct. 9, 2015, 43 pages.
PCT International Search Report and Written Opinion in International Appln. No. PCT/US2021/046864, dated Dec. 23, 2021, 14 pages.

* cited by examiner

HIGH TEMPERATURE CROSS-LINKED FRACTURING FLUIDS WITH REDUCED FRICTION

TECHNICAL FIELD

This document relates to methods and compositions used in hydraulic fracturing operations, particularly those with reduced friction for crosslinked fracturing fluid systems applicable for temperatures of up to 450° F. and higher.

BACKGROUND

The reduction of friction during fracturing treatment in the oilfield is an ongoing challenge. In unconventional fields, slickwater is the main fracturing fluid type used in the hydraulic fracturing treatment. Since water is a Newtonian fluid, it generates high treatment pressures due to friction pressure loss at high pumping rate. To reduce the friction pressure, very low concentration of high molecular weight of acrylamide-based polymers are added to the fluid, which is called slickwater treatment. However due to its relative low viscosity, the slickwater treatment only can carry 0.2-2 pound per gallon (ppg) of proppants and is also typically pumped at higher pumping rate, for example, 60-110 barrels per minutes (bpm). Accordingly, polymers used in fracturing fluids are often crosslinked to improve the viscosity and, thus, the ability to transport proppant.

SUMMARY

An embodiment described in examples herein provides a hybrid fracturing fluid. The hybrid fracturing fluid includes a mixture of an aqueous copolymer composition including a crosslinkable polymer (CLP), the CLP including crosslinking sites. The mixture also includes a crosslinker for the crosslinking sites, and a friction reducing polymer (FRP).

Another embodiment described in examples provides a method of treating a subterranean formation. The method includes introducing a hybrid fracturing fluid into the subterranean formation. The hybrid fracturing fluid includes a crosslinkable polymer (CLP) including crosslinkable functional groups, a crosslinker to crosslink the crosslinkable functional groups, and a friction reducing polymer (FRP), wherein the friction reducing polymer does not react with the crosslinker. The method includes crosslinking the crosslinkable polymer.

Another embodiment described in examples herein provides a hybrid fracturing fluid. The hybrid fracturing fluid includes a mixture of a crosslinkable polymer including acrylic acid monomer units and a crosslinker including a metal. The hybrid fracturing fluid includes a friction reducing polymer that does not have functionality to react with the crosslinker.

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

As described herein, fracturing fluids including cross-linked (which may be referred to as "cross-linked") polymers such as polysaccharide-based fluids and synthetic water-soluble polyacrylamide-based fluids are designed to transport higher proppant concentrations and reduce leakoff. However, balancing the objectives of proppant transport and friction reduction may be challenging with a crosslinked fluid system.

Accordingly, embodiments described herein provide a hybrid fracturing fluid system for stimulating hydrocarbon reservoirs. The hybrid fracturing fluid system includes at least two polymers. For example, the hybrid fracturing fluid will include a first polymer, termed a crosslinkable polymer (CLP) herein, that can be crosslinked with a crosslinker. Further, the hybrid fracturing fluid will include a second polymer, termed a friction reducing polymer (FRP) herein, which cannot be crosslinked with the given crosslinker. The CLP will allow for the adjustment of viscosity in the fracturing fluid, while the FRP will function as a linear friction reducer during the pumping of the hybrid fracturing fluid.

The selection of the CLP determines the functional groups present for crosslinking, and, thus, determines the choices available for the FRP. For example, a CLP based on a galactomannan such as guar which contains cis-hydroxy groups and using a borate crosslinker may be used with an FRP that does not include hydroxyl groups, such as a polyacrylamide, partially hydrolyzed polyacrylamide, a copolymer of acrylamide and 2-acrylamido-2-methylpropanesulfonic acid (AMPSA), a terpolymer of acrylamide, acrylic acid and 2-acrylamido-2-methylpropanesulfonic acid (AMPSA), or other acrylamide-based polymers with hydrophobic monomers. As another example, a CLP which contains carboxylic acid groups such as carboxymethyl cellulose (CMC), carboxymethyl guar (CMG), carboxymethyl hydroxypropyl guar (CMHPG), partially hydrolyzed polyacrylamide (PHPA), a terpolymer of acrylamide, acrylic acid and 2-acrylamido-2-methylpropanesulfonic acid (AMPSA) or any other acrylamide-based polymer which contains acrylic acid monomer or their salts, and using a transition metal-based crosslinker such as zirconium, titanium or chromium, may be used with an FRP that does not include carboxylic acid or carboxylate groups, such as a polyacrylamide or a copolymer of acrylamide and 2-acrylamido-2-methylpropanesulfonic acid (AMPSA), or other acrylamide-based polymer with hydrophobic monomers but without carboxylic acid or carboxylate group. It should be noted that the choice of the crosslinker also influences the choice of the FRP. For example, a metal ion crosslinker, such as a titanium or zirconium based crosslinker, would also eliminate the use of an FRP that includes hydroxyl groups.

In some embodiments, the hybrid fracturing fluid includes a gel stabilizer, clay stabilizer, a viscosity breaker, a proppant, or a pH adjusting agent, or any combinations thereof. The pH adjusting agent is selected based, at least in part, on the first polymer and is used to adjust the pH of the hybrid fracturing fluid to the appropriate level for crosslinking, as described further herein.

Crosslinkable Polymer (CLPs)

Different types of CLPs can be used in embodiments described herein. For example, the CLP can be a polysaccharide, such as a galactomannan or a modified cellulose. Galactomannans are polysaccharides that have a mannose backbone with galactose side chains. They are generally agricultural products isolated from pulses or seeds. The ratio between the mannose groups and the galactose groups depends on the source, for example, fenugreek gum has a mannose to galactose ratio of about 1 to 1, guar gum has a mannose to galactose ratio of about 2 to 1, tara gum has a mannose to galactose ratio of about 3 to 1, carob gum has a mannose to galactose ratio of 4 to 1, and cassia gum has a mannose to galactose ratio of about 5 to 1.

Any of these materials or any other types of natural or derivatized galactomannans could be used in various embodiments of the hybrid fracturing fluids. In some embodiments, guar gum is selected, because of its abundance, relative low cost, and capability to work at up to 350° F. when formulated at high pH (for example, greater than 9.5). In some embodiments, a modified cellulose, such as carboxymethyl cellulose is selected as the CLP.

Generally, the polysaccharides such as guar are crosslinkable through free cis-hydroxy groups on the galactose side chain. Accordingly, a galactomannan may be crosslinked using a borate crosslinker at a high pH, for example, greater than 9.0. The pH may be adjusted to this level using a carbonate-bicarbonate buffer, organic amine, a hydroxide, or other systems. Derivatized galactomannans such as hydroxypropyl guar (HPG), CMG or CMHPG may also be crosslinked using a transition metal based crosslinker, such as chromium, titanium or zirconium-based crosslinker.

Natural polymers, such as the polysaccharides or their derivatives, may have some disadvantages for use in fracturing fluids. For example, guar-based fracturing fluids may leave an insoluble residue in the reservoir which may cause permeability reduction. They also face significant polymer breakdown under high temperature around 350-400° F.

In general, synthetic water-soluble polymers, such as acrylamide-based polymers are more thermally stable and often considered to be residue-free. These polymers can be used for preparing hybrid fracturing fluids around 300-450° F. or more.

Synthetic Water-Soluble Acrylamide-Based CLPs

In one embodiment, the CLP is a synthetic water-soluble acrylamide-based polymer including acrylic acid monomer units that provide a carboxylic acid functionality. Examples for this type of the polymers can be copolymer of acrylamide and acrylic acid or a terpolymer of acrylamide, acrylic acid and 2-acrylamido-2-methylpropanesulfonic acid. The acrylic acid monomer units may be in the form of a salt of acrylic acid. The crosslinker includes a transition metal (such as zirconium, titanium or chromium) or metal oxides. A weight ratio of the metal to the copolymer or terpolymer or tetrapolymer is in the range of 0.01 to 0.08.

In some embodiments, the CLP is a copolymer that includes at least three monomer units: 2-acrylamido-2-methylpropanesulfonic acid (AMPSA), acrylamide, and acrylic acid or a related salt thereof. The copolymer typically has less than 55 mol % of AMPSA. In some embodiments, the copolymer has less than 20 mol % AMPSA. In some embodiments, the copolymer has between 1 mol % and 55 mol %, between 1 mol % and 40 mol %, between 1 mol % and 25 mol %, between 10 mol % and 30 mol %, between 12 mol % and 20 mol %, or between 13 mol % and 17 mol % AMPSA. In some embodiments, the copolymer has about 1 mol %, 5 mol %, 10 mol %, 20%, 25 mol %, 30 mol %, 35 mol %, 40 mol %, 45 mol %, 50 mol %, or 55 mol % AMPSA. The copolymer can also have about 15 mol % of the AMPSA. The copolymer can have about 0.1 mol % to about 30 mol % of acrylic acid. In some embodiments, the copolymer is a terpolymer including AMPSA, acrylamide, and acrylic acid or a related salt thereof. The terpolymer has less than 55 mol % AMPSA. In some embodiments, the terpolymer has less than 20 mol % AMPSA. In some embodiments, the terpolymer has between 5 mol % and 40 mol %, between 10 mol % and 30 mol %, between 12 mol % and 20 mol %, or between 13 mol % and 17 mol % AMPSA. In some embodiments, the terpolymer has about 5 mol %, 10 mol %, 20%, 25 mol %, 30 mol %, 35 mol %, 40 mol %, 45 mol %, 50 mol %, or 55 mol % AMPSA. The terpolymer can also have about 15 mol % AMPSA. The terpolymer can have about 0.1 mol % to about 30 mol % of acrylic acid. In an embodiment, the amount of acrylic acid is greater than 0 mol %.

As described herein, the CLP is combined with crosslinkers to produce crosslinked fluids that function as efficient proppant transportation fluids at low polymer loadings. For example, it has been discovered that a fracturing fluid having a copolymer concentration of less than 30 pounds per thousand gallons (pptg) can produce crosslinked fluids when combined with a crosslinker, even at a low crosslinker/copolymer ratio for use at 450° F. or higher. In some embodiments, a fracturing fluid has a copolymer in a concentration of less than 50 pptg, less than 35 pptg, less than 30 pptg, less than 25 pptg, or less than 20 pptg. In some embodiments, a fracturing fluid includes a copolymer in a concentration between 10 and 40 pptg, between 15 and 35 pptg, or between 20 and 30 pptg. In some embodiments, a fracturing fluid includes a copolymer in a concentration of about 10 pptg, 15 pptg, 20 pptg, 25 pptg, 30 pptg, 35 pptg, 40 pptg, 45 pptg, or 50 pptg. For example, for a 400° F. application, a fracturing fluid including a copolymer at a concentration of about 30 pptg can be used. For example, for a 300° F. application, a fracturing fluid including a copolymer at a concentration of about 20 pptg can be used.

A terpolymer of AMPSA, acrylamide, and acrylic acid or a related salt thereof may be obtained by copolymerizing AMPSA, acrylic acid and acrylamide in specified amounts. The terpolymer can also be produced by initially polymerizing AMPSA and acrylamide, and hydrolyzing the acrylamide to generate desired amounts of acrylic acid, such that the number of moles of acrylamide and acrylic acid monomer units is equal to total number of moles of acrylamide initially employed. The copolymer can be employed as water-in-oil emulsion or suspension concentrate, or as a solid dissolved in an aqueous fluid.

Synthetic water-soluble CLPs provided herein can include low ratios of crosslinker to copolymer. Suitable crosslinkers typically include a metal, metal oxide, or both. In some embodiments, the crosslinker includes zirconium. Suitable zirconium crosslinkers include, for example, zirconium complexes in which zirconium is complexed with ligands such as lactate salts (for example, sodium zirconium lactate), triethanolamines, alkoxides (for example, isopropoxide and propoxide), 2,2'-iminodiethanol, and mixtures of these ligands. The crosslinker may be suitably dissolved in aqueous fluids, non-aqueous fluids or liquids (for example, alcohol such as n-propanol), and the combination of aqueous, water-miscible non-aqueous solvents (for example, alcohols and aminoalcohols). TYZOR 212, available from Dorf Ketal as a solution in n-propanol, is one example of a Zr crosslinker. When 20 pptg to 30 pptg of the copolymer is present in the fracturing fluid and the crosslinking solution is TYZOR 212, a weight ratio of Zr to copolymer may be in a range of about 0.01 to about 0.8 (such as about 0.2 to about 0.6 or about 0.2 to about 0.4), and a weight percentage of Zr in the fracturing fluid may be in a range of about 0.001 wt % to about 0.24 wt %.

Crosslinkers suitable for the hybrid fracturing fluid may also include titanium (Ti) crosslinkers. Suitable titanate crosslinkers include, for example, titanate crosslinkers with ligands such as lactates and triethanolamines, and mixtures thereof, optionally delayed with hydroxyacetic acid. Crosslinkers suitable for the hybrid fracturing fluid may also include aluminum (Al) crosslinkers, chromium (Cr) crosslinkers, iron (Fe) crosslinkers, hafnium (Hf) crosslinkers, and combinations thereof. In some embodiments, a crosslinking solution including about 7 wt % to about 20 wt % of a metal crosslinker can be present at a concentration of about 0.1 gpt to about 5.0 gpt, about 0.5 gpt to about 1.5 gpt, or about 0.9 to about 1.1 gpt of the fracturing fluid.

In some embodiments, the hybrid fracturing fluids provided herein are formed by mixing a CLP and an FRP, as described herein, with an aqueous carrier, such as water. The aqueous carrier can include water, fresh water, brine, produced water, flowback water, brackish water, Arab-D-brine, sea water, or combinations thereof. In some embodiments, the water is field water. In some embodiments, the field water has less than 50,000 mg/L of total dissolved solids (TDS). In some embodiments, the field water has between 500 and 20,000 mg/L TDS, between 700 and 10,000 mg/L TDS, between 800 and 2000 mg/L TDS, or between 1,000 and 1,500 mg/L TDS. In some embodiments, the field water has about 500 mg/L TDS, 600 mg/L TDS, 700 mg/L TDS, 800 mg/L TDS, 900 mg/L TDS, 1,000 mg/L TDS, 1,200 mg/L TDS, 1,400 mg/L TDS, 2,000 mg/L TDS, 5,000 mg/L TDS, 10,000 mg/L TDS, 20,000 mg/L TDS, or about 50,000 mg/L TDS.

In some embodiments, the hybrid fracturing fluid includes at least one of a gel stabilizer, clay stabilizer, or other suitable additive. In some embodiments, the gel stabilizer includes an antioxidant. In some embodiments, the gel stabilizer includes phenols, polyphenols, di-tertbutyl alkyl phenols, hydroquinone, apigenin, resveratrol, ascorbic acid, tocopherol, sodium bisulfite, sodium hydrogen sulfite, sodium thiosulfate, ammonium thiosulfate, thiourea, or a combination thereof. In some embodiments, the clay stabilizer includes sodium chloride, potassium chloride, ammonia chloride, tetramethylammonium chloride (TMAC), other quaternary molecules, or a combination thereof. In some embodiments, bromides, such as sodium bromide or potassium bromide, is included.

In some embodiments, the hybrid fracturing fluid includes a pH adjusting agent. The choice of the pH adjusting agent depends on the CMP selected. For example, for water-soluble synthetic polymers the hybrid fracturing fluid can include an acetic acid solution, an acetic acid/acetate buffer solution, or hydrochloric acid. In some embodiments, an acid is added to a fracturing fluid to achieve a pH between about 2 and 7, 3 and 6.5, and 5 and 5.5, or between about 5 and 7 or 5.5 and 6.5.

As described herein, a higher friction is seen for crosslinked fracturing fluids with higher viscosities. In this situation, higher horsepower for fracturing will be needed in order to maintain the same pumping rate for crosslinked fluid with higher viscosities. Accordingly, a fluid system with controllable friction for crosslinked fracturing fluids during pumping is useful. Thus, in various embodiments, the hybrid fracturing fluid includes a friction reducing polymer (FRP).

In some embodiments, a hybrid fracturing fluid includes a CLP, a crosslinker, a gel stabilizer, a clay stabilizer, and the FRP. The CLP includes acrylamide, acrylic acid, and about 15 mol % AMPSA. The crosslinker is in the form of a crosslinking solution including about 12.4 wt % Zr. In some embodiments, the copolymer is present at a concentration of about 30 pptg, the crosslinking solution is present at a concentration of about 0.9 gpt, the gel stabilizer is present as a gel stabilizer solution at a concentration of about 3.0 gpt, and the clay stabilizer is present as a clay stabilizer solution at a concentration of about 2 gpt. In some embodiments, the copolymer is present at a concentration of about 25 pptg, the crosslinking solution is present at a concentration of about 0.9 gpt, the gel stabilizer is present at a concentration of about 0.5 gpt, and the clay stabilizer is present at a concentration of about 2 gpt. In some embodiments, the copolymer is present at a concentration of about 20 pptg, the crosslinking solution is present at a concentration of about 1.1 gpt, the gel stabilizer is present at a concentration of about 0.4 gpt, and the clay stabilizer is present at a concentration of about 2 gpt. In some embodiments, the FRP is a copolymer of acrylamide and AMPSA. In some embodiments, the FRP is present in the hybrid fracturing fluid at a concentration of about 5 pptg. In some embodiments, the FRP is present in the hybrid fraction included a concentration of about 2 pptg.

In some embodiments, a fracturing fluid includes a terpolymer, a crosslinker, a gel stabilizer, a clay stabilizer, and the FRP. The terpolymer includes acrylamide, acrylic acid, and about 15 mol % of AMPSA. The crosslinker is in the form of a crosslinking solution including about 12.4 wt % Zr. In some embodiments, the terpolymer is present at a concentration of about 30 pptg, the crosslinker is present at a concentration of about 0.9 gpt, the gel stabilizer is present at a concentration of about 3.0 gpt, and the clay stabilizer is present at a concentration of about 2 gpt. In some embodiments, the terpolymer is present at a concentration of about 25 pptg, the crosslinking solution is present at a concentration of about 0.9 gpt, the gel stabilizer is present at a concentration of about 0.5 gpt, and the clay stabilizer is present at a concentration of about 2 gpt. In some embodiments, the terpolymer is present at a concentration of about 20 pptg, the crosslinker is present at a concentration of about 1.1 gpt, the gel stabilizer is present at a concentration of about 0.4 gpt, and the clay stabilizer is present at a concentration of about 2 gpt. In some embodiments, the FRP is a copolymer of acrylamide and AMPSA. In some embodiments, the FRP is present in the hybrid fracturing fluid at a concentration of about 5 pptg. In some embodiments, the FRP is present in the hybrid fraction included a concentration of about 2 pptg.

In one embodiment, a hybrid fracturing fluid includes a crosslinker including a metal and an aqueous copolymer composition including a copolymer, the copolymer comprising 2-acryl-amido-2-methylpropanesulfonic acid, acrylamide, and acrylic acid monomer units, or a salt thereof. The copolymer may include 1 mol % to 55 mol % of the 2-acrylamido-2-methylpropane-sulfonic acid monomer units. The weight ratio of the metal to the copolymer is in a range of 0.01 to 0.8. The pH of the fracturing fluid may be in a range of about 5 to about 7, or about 5.5 to about 6.5. In one embodiment, the crosslinker is present in an amount sufficient to yield a crosslinked fluid having a viscosity of at least 350 cP at a temperature of 300° F. and a pH of 6.5, measured at 100 $s^{-1}$ shear rate.

In some embodiments, the hybrid fracturing fluid includes a proppant. Examples of proppants include sand, gravel, glass beads, polymer beads, ground products from shells and seeds (such as walnut hulls), and manmade materials (such as ceramic proppant, bauxite, tetrafluoroethylene materials), fruit pit materials, processed wood, composite particulates prepared from a binder, and fine grade particulates such as silica, alumina, fumed silica, carbon black, graphite, mica, titanium dioxide, meta-silicate, calcium silicate, kaolin, talc, zirconia, boron, fly ash, hollow glass microspheres, solid glass, or a combination thereof.

Examples of Hybrid Fracturing Fluids

In various embodiments, the FRP used in the hybrid fracturing fluid system is a polymer without an acrylic acid component as the carbonic acid functionality will crosslink with the metal crosslinkers. Examples of the acrylamide-based polymers which do not have the acrylic acid component could be copolymers of acrylamide and 2-acrylamido-2-methylpropanesulfonic acid, or polyacrylamide, or poly AMPS, or mixtures thereof. The concentration of the FRP in the hybrid fracturing fluid can range from 0.1 pptg to 20 pptg. In some embodiments, the concentration of the FRP is between about 0.5 pptg and about 20 pptg, or between about 1 pptg and about 10 pptg, or between about 2 pptg and about 5 pptg. In some embodiments, the concentration of the FRP is about 0.5 pptg. In some embodiments, the concentration of the FRP is about 1 pptg. In some embodiments, the concentration of the FRP is about 2 pptg. In some embodiments, the concentration of the FRP is about 5 pptg. In some embodiments, the concentration of the FRP is about 10 pptg. A pH adjusting agent in this case can include an acetic acid solution, an acetic acid/acetate buffer solution, or hydrochloric acid. In some embodiments, a pH adjusting agent is added to the hybrid fluid system to achieve a pH between 2 to 7.

In another embodiment, the CLP is guar and the crosslinker is borate. In this case, the FRP can be any acrylamide-based polymer which does not have cis-hydroxy groups. The concentration of the FRP in the hybrid fracturing fluid can range from 0.1 pptg to 20 pptg. A pH adjusting agent in this case can include carbonate salt, bicarbonate salt or hydroxides. In some cases, a pH adjusting agent is added to the hybrid fluid system to achieve a pH between 9 and 12.

In another embodiment, the CLP is a derivatized polysaccharide, such as hydroxypropyl guar (HPG) or carboxymethyl hydroxypropyl guar (CMHPG), or carboxymethylcellulose (CMC). The crosslinker includes a metal, such as zirconium, titanium or chromium, or metal oxides. A weight ratio of the metal to the base polymer is in the range of 0.01 to 0.08. In these embodiments, the FRP for the hybrid fracturing fluid includes polymers lacking an acrylic acid monomer, which would crosslink with the metal crosslinkers. Examples of the acrylamide-based polymers which do not have the acrylic acid component could be copolymers of acrylamide and 2-acrylamido-2-methylpropanesulfonic acid, or polyacrylamide or poly AMPS. The concentration of the FRP in hybrid fracturing fluid can range from 0.1 pptg to 20 pptg. A pH adjusting agent in this case can include an acetic acid solution, an acetic acid/acetate buffer solution, or hydrochloric acid. In some cases, a pH adjusting agent is added to the hybrid fluid system to achieve a pH between 2 to 7.

Figure 1:
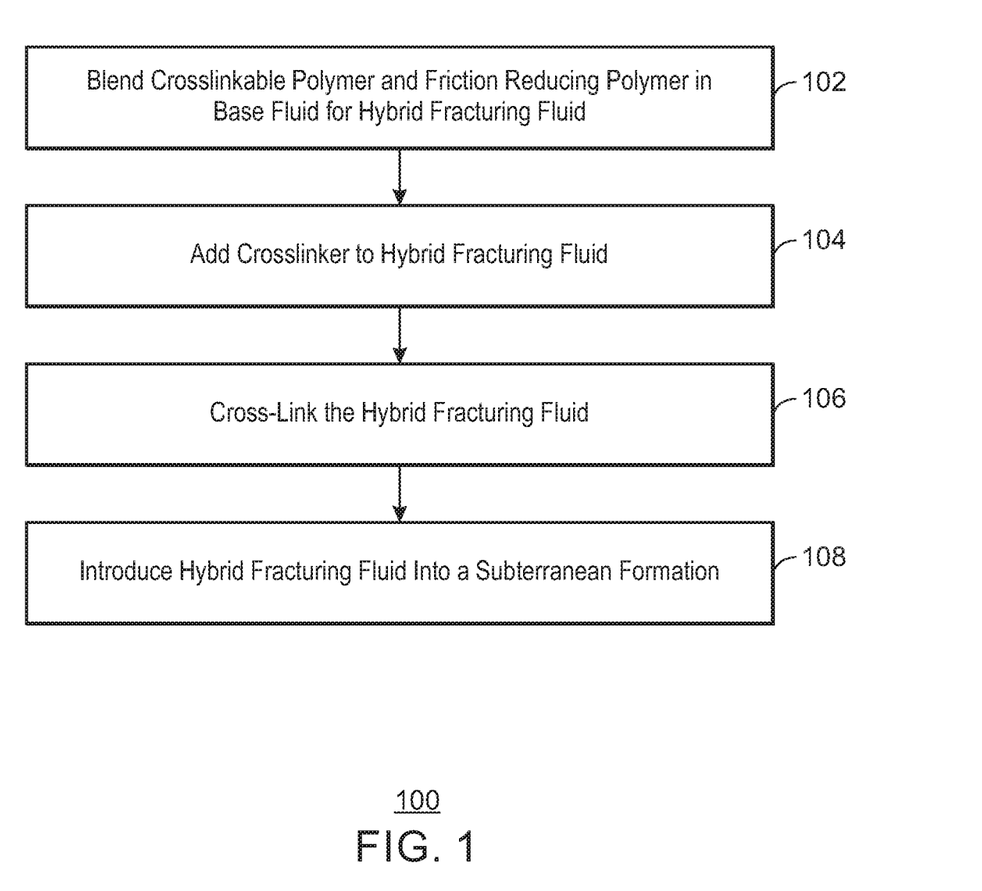
FIG. 1 is a process flow diagram of a method for treating formation with a fracturing fluid comprising polymer mixtures described herein.

FIG. 1 is a process flow diagram of a method 100 for treating a formation with a fracturing fluid comprising polymer mixtures described herein. The method begins at block 102, when the CLP and FRP are blended into the base fluid for the hybrid fracturing fluid. This may be done at the drilling site, for example, by blending dry powders into the base fluid. In some embodiments, the CLP and FRP may be blended into a liquid mixture at a remote site. The liquid mixture may then be blended with the base fluid at the drilling site. In some embodiments, the hybrid fracturing fluid includes a CLP comprising a copolymer, the copolymer comprising 2-acrylamido-2-methylpropane-sulfonic acid monomer units, acrylamide monomer units, and acrylic acid monomer units, or a salt thereof. In some embodiments, the fracturing fluid includes an aqueous copolymer composition comprising a copolymer, the copolymer comprising acrylamide monomer units, or acrylic acid monomer units, or both, or salts thereof.

At block 104, a crosslinker is added to the hybrid fracturing fluid. In some embodiments, the fracturing fluid includes a crosslinker comprising a metal. In some embodiments, the fracturing fluid includes a friction reducing polymer, wherein the fracturing fluid comprises greater than 1 pptg of the friction reducing polymer.

At block 106, the CLP of the hybrid fracturing fluid is crosslinked yield a crosslinked fracturing fluid. The crosslinking may be performed as the hybrid fracturing fluid is flowed into the wellbore, or may be performed at the surface as the proppant is blended in.

At block 108, the hybrid fracturing fluid is introduced into a subterranean formation.

EXPERIMENTAL

Chemicals:

M1—The terpolymer used as the CLP in the examples described below is in a water-in-oil emulsion form (30% active) containing 15 mol % of 2-acrylamido-2-methylpropanesulfonic acid (AMPSA), 5 mol % of acrylic acid (AA), and 80 mol % acrylamide (AM).

M2—Acetic acid/acetate buffer solution, (PABA-152L from Precision Additives).

M3—Zirconium ((Zr) crosslinker (TYZOR® 212, with 16.75 wt % $ZrO_2$ and 12.4 wt % Zr).

M4—Gel stabilizer (CELB 225-10-2, available from ChemEOR).

M5—Clay stabilizer, (Cla-Web™ from Halliburton).

M6—The FRP is a copolymer of acrylamide and AMPS (FloJet DRP 1130 from SNF), and does not include functional that will crosslink with the zirconium crosslinker.

Procedures:

Proxy Measurement for Friction Measurements

No current laboratory friction loop design can be used to measure the friction for crosslinked fluids due to their relatively high viscosity range in comparison to the linear fluids which are commonly used in the slickwater treatment. Accordingly, viscosity measurements were used as a proxy to indirectly indicate the friction change of the polymer mixtures used for the hybrid fracturing fluids.

"Cup and bob" is a type of rotational rheometer (viscometer) that is based on measuring the torque required to turn an object in a fluid. The torque is a function of the viscosity of the fluid, and is measured at a constant angular velocity. Since viscosity is normally considered in terms of shear stress and shear rates (Eqn. 1), a method is needed to convert from instrument numbers to rheology numbers. Each measuring system used in an instrument has its associated form factors to convert torque to shear stress and to convert angular velocity to shear rate. In Eq. 2 and Eq. 3, $C_1$ is used as the shear stress form factor and $C_2$ is used as the shear rate factor.

$$\text{Viscosity=shear stress/shear rate,} \quad \text{(Eq. 1)}$$

wherein:

$$\text{Shear stress=torque} \div C_1; \text{ and} \quad \text{(Eq. 2)}$$

$$\text{Shear rate=}C_2 \times \text{angular velocity.} \quad \text{(Eq. 3)}$$

In a coaxial cylinder design of viscometer, such as the cup and bob, $C_1$ and $C_2$ are calculated using Eqns. 4 and 5:

$$C_1 = \frac{1}{3}r_a^2 H; \quad \text{(Eq. 4)}$$

and $$C_2 = \frac{2r_i^2 r_o^2}{r_a^2(r_o^2 - r_i^2)}. \quad \text{(Eq. 5)}$$

In Eqns. 4 and 5:
 $r_a=(r_i+r_o)/2$ is the average radius;
 $r_i$ is the inner radius;
 $r_o$ is the outer radius; and
 H is the height of cylinder.

Thus, viscosity is proportional to the torque. Under the same shear rate, a higher viscosity measurement indicates higher torque, which indicates higher friction during shear. Since the viscosity measurement from the rotational rheometer is related to the torque (moment, M) reading, the viscosity change among different fluid system is expected to reflect the torque changes. As described below, the fluid viscosity is measured under high temperature and high pressure conditions for the desired fluid systems.

Viscosity Measurement Under High Temperature and High Pressure.

To measure the viscosity of fracturing fluid systems under high temperature and high pressure subterranean reservoir formation, sample volumes of about 100 mL were prepared for each test and 50 mL aliquots of each fracturing fluid system were injected into a Grace M5600 HPHT rheometer equipped with a B5 bob configuration. Tests were performed using a heating profile and a shear rate of 100 s$^{-1}$ with desired shear ramps of 100 s$^{-1}$, 75 s$^{-1}$, 50 s$^{-1}$, 25 s$^{-1}$, 50 s$^{-1}$, 75 s$^{-1}$, and back to 100 s$^{-1}$.

Example 1

In the first example, a fracturing fluid including a synthetic field water (with the composition shown in Table 1), 25 pptg terpolymer (M1), 4.5 pptg buffer solution (M2), 2 gpt gel stabilizer (M4), 2 gpt clay stabilizer (M5), and 0.6 gpt of Zr crosslinker (M3) was prepared. The pH of the mixed fluid was 5.2. The weight ratio of Zr to terpolymer M1 was about 0.0263. The viscosity of the resulting crosslinked fracturing fluid at shear rate of 100 s$^{-1}$ was measured at 300° F.

TABLE 1

Water Analysis of the formation water.

| Component | Concentration (mg/L) |
|---|---|
| Calcium | 0.27 |
| Magnesium | 1.56 |
| Chloride | 266 |
| Sulfate | 201 |
| Bicarbonate | 198 |

Figure 2:
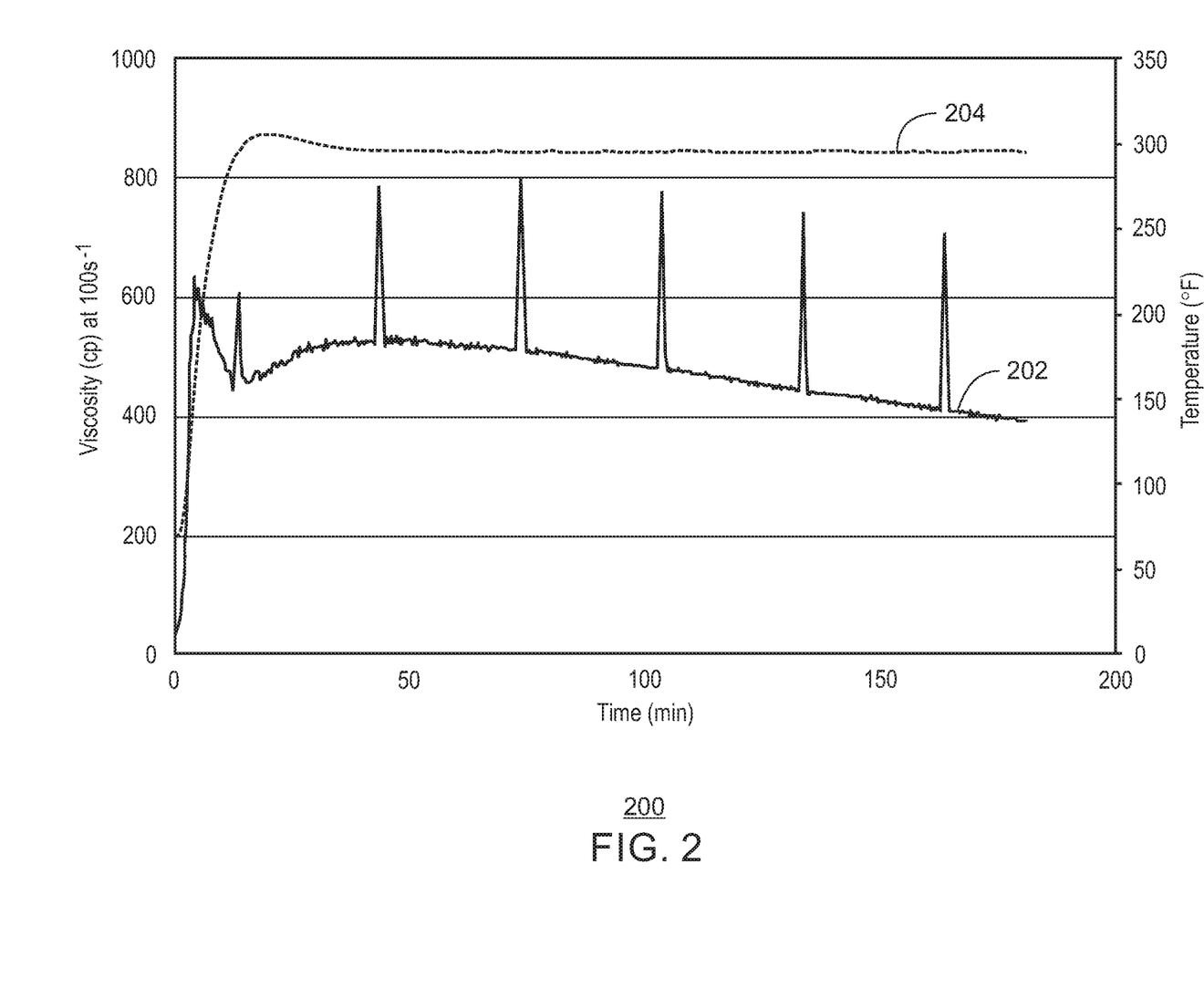
FIG. 2 is a plot of the viscosity and temperature versus time for Example 1.

FIG. 2 is a plot 200 of the viscosity 202 and temperature 204 versus time for Example 1. The fracturing fluid maintained a viscosity of greater than 300 cP at a shear rate of 100 s-1 for more than 3 hours. Example 1 was used as a control for comparison with polymer mixtures that included both crosslinkable polymers and friction reducing polymers that were not crosslinkable.

In Examples 2-5, the fracturing fluids were prepared with synthetic field water (in Table 1), 25 pound per one thousand gallon (pptg) M1 terpolymer, 4.5 gallon per one thousand gallon buffer solution M2, 2 gpt gel stabilizer M4, 2 gpt clay stabilizer M5, and 0.6 gpt Zr crosslinker (M3) and different concentrations of the friction reducing polymer, as shown in Table 2. As for Example 1, the viscosities of the resulting crosslinked fracturing fluids were measured at a shear rate of 100 s$^{-1}$ and a temperature of 300° F.

TABLE 2

Amount of friction reducing polymer (second polymer) used in Examples 2-5

| Example | Amount of second polymer (pptg) | pH of mixed fluid |
|---|---|---|
| 2 | 0.5 | 5.20 |
| 3 | 1.0 | 5.16 |
| 4 | 5.0 | 5.19 |
| 5 | 10 | 5.20 |

Figure 3:
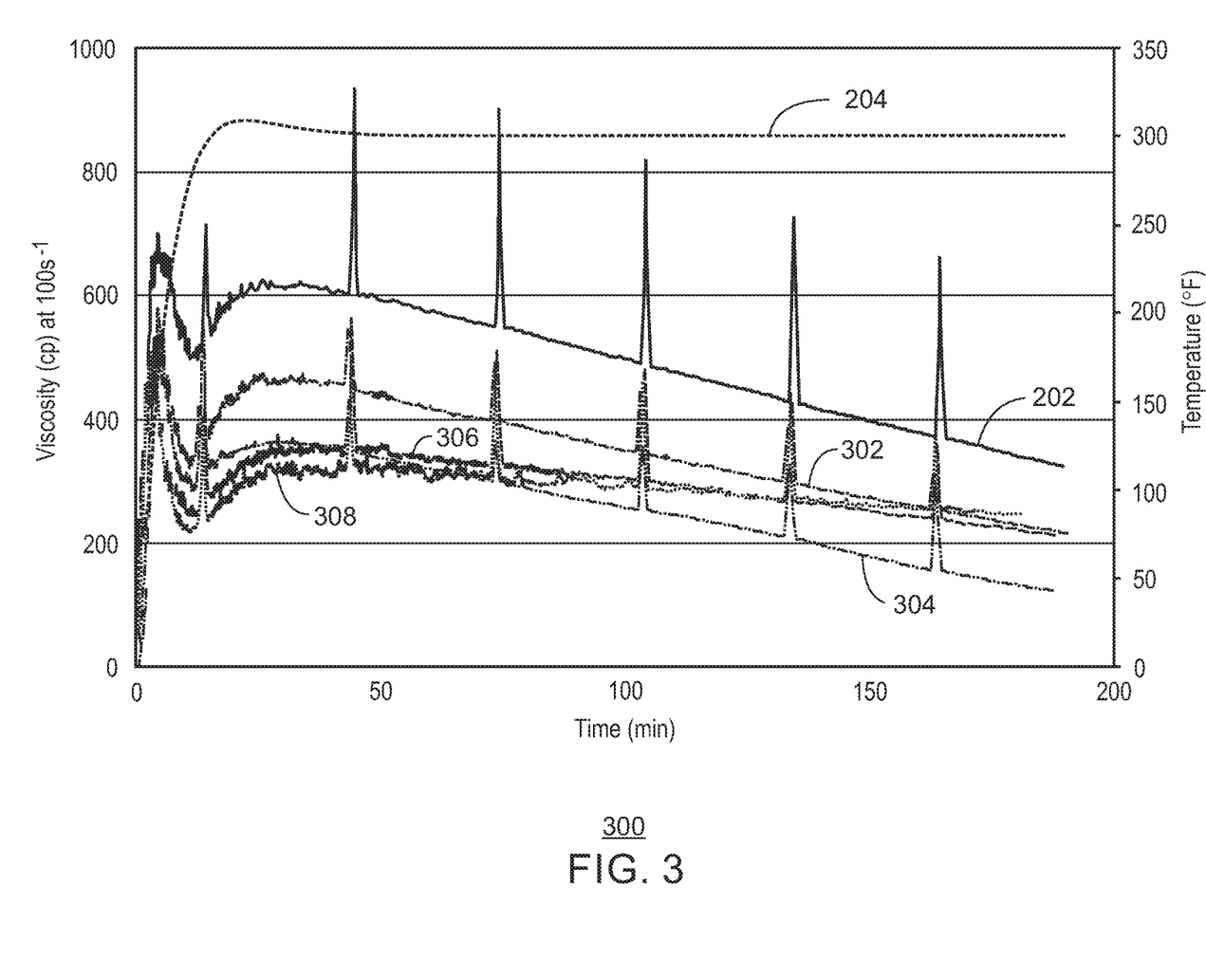
FIG. 3 is a plot of the viscosity of hybrid fluids with addition of friction reducing polymer at different concentrations.

FIG. 3 is a plot 300 of the viscosity of hybrid fluids with addition of the friction reducing polymer at different concentrations. Like numbered items are as described with respect to FIG. 2. The plot 300 shows viscosity 302 versus time for Example 3 (with addition of 0.5 pptg friction reducing polymer). The plot also shows viscosity 304 versus time for Example 3 (with addition of 1.0 pptg friction reducing polymer), viscosity 306 versus time for Example 4 (with addition of 5.0 pptg friction reducing polymer), and viscosity 308 versus time for Example 5 (with addition of 10.0 pptg friction reducing polymer).

It can be seen that with addition of 0.5 pptg of the friction reducing polymer additive, the viscosity 302 is lower than the viscosity 202 of Example 1, which is opposite to what would be expected for a typical synergistic fluid systems, in which the viscosity increases with addition of polymers. With addition of 1.0 pptg of the friction reducing polymer, the viscosity 304 is further reduced from the viscosity 202 of Example 1. When the polymer additive concentration gets to 5.0 pptg (viscosity 306) and 10.0 pptg (viscosity 308), the reduction in viscosity early in the testing time, before 40 min, remains similar and does not show additional viscosity decrease in comparison to concentration of 1.0 pptg. Further, both the 5.0 pptg and 10 pptg fluids show relatively higher viscosity than the 1.0 pptg fluid, viscosity 304, after 50 min of the testing time. This may be due to a viscosifying effect at relative higher concentrations of the additional polymers which stabilizes the fluid viscosity under high temperature.

Table 3 shows the viscosity of Example 1-5 at 100 s$^{-1}$ at testing time of 25 min. Percentage of viscosity reduction over Example 1 (no additive) with different amount of friction reducing polymer as calculated as well.

TABLE 3

Viscosity at testing time of 25 min.

| Additive Concentration (pptg) | Viscosity at 25 min (cP at 100 s-1) | Viscosity Reduction (%) |
|---|---|---|
| 0 | 609 | |
| 0.5 | 466 | 23.5 |
| 1.0 | 360 | 40.9 |
| 5.0 | 338 | 44.5 |
| 10.0 | 313 | 48.6 |

Example 6

In Example 6, an encapsulated high temperature viscosity breaker, ProCap BR (available from Fritz), was added to test the cleanup of the hybrid high temperature fracturing fluid. In Example 6, 4 pptg ProCap BR (24 mg per 50 mL of the fluid) were added to the fluid formulation of Example 2, which includes 0.5 pptg of the friction reducing polymer. The pH of the mixed fluid was 5.45. Viscosity of the resulting crosslinked fracturing fluid at shear rate of 100 s$^{-1}$ was measured at 300° F.

Figure 4:
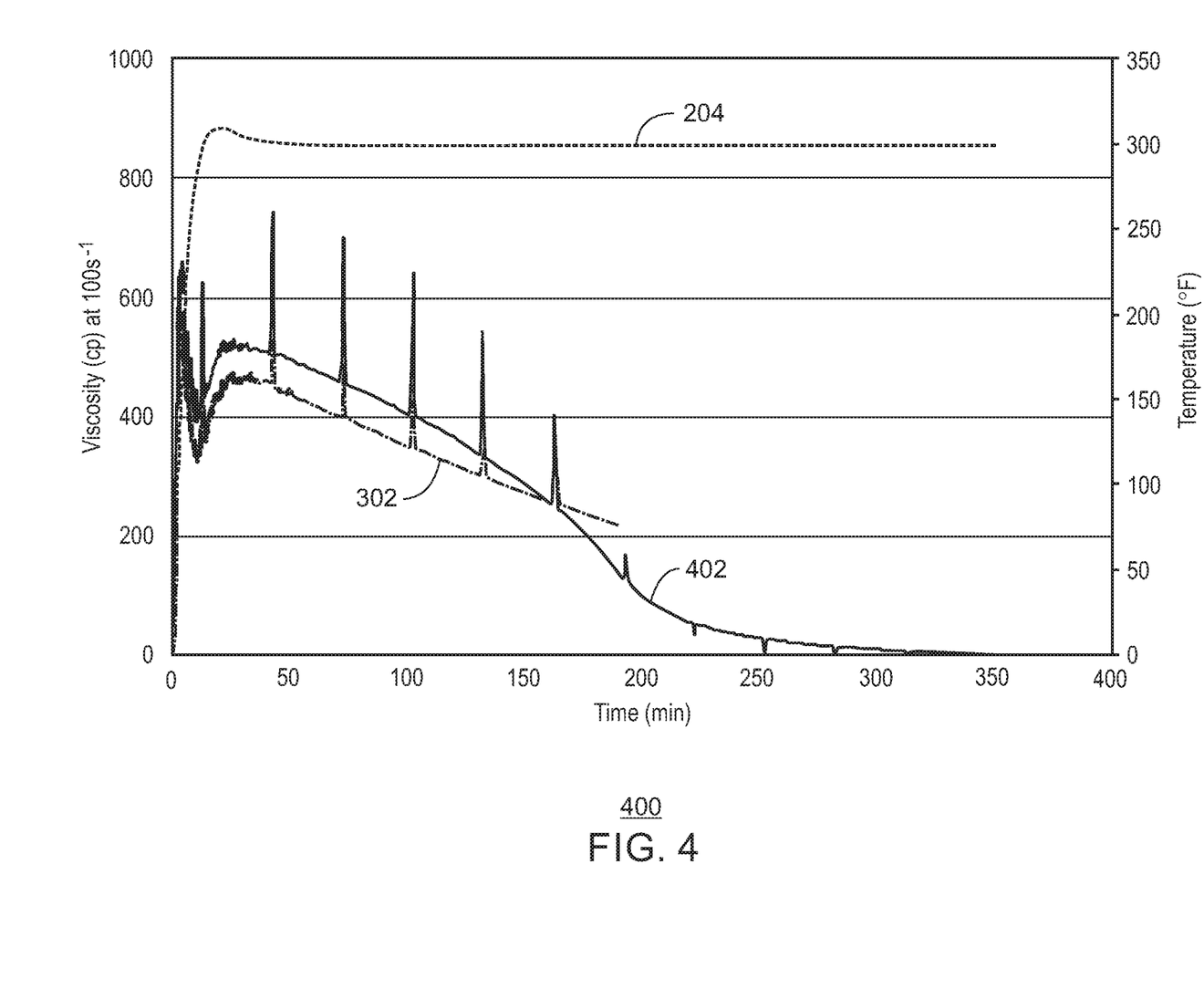
FIG. 4 is a plot that shows the viscosity of the friction reducing polymer assisted fluid in Example 2 with the addition of a viscosity breaker.

FIG. 4 is a plot 400 that shows the viscosity 402 of the friction reducing polymer assisted fluid in Example 2 with the addition of a viscosity breaker. Like numbered items are as described with respect to FIG. 3. As described herein, Example 2, shown as viscosity 302, includes 1.0 pptg friction reducing polymer. The addition of 4 pptg of encapsulated breaker (ProCap BR) allows the viscosity 402 to maintain above 300 cP for at least 80 min, then drop to about 10 cP after about 360 min.

Definitions

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

As used herein, the term "polymer" refers to a molecule having at least one repeating unit and can include copolymers.

The term "copolymer" as used herein refers to a polymer that includes at least two different repeating units. A copolymer can include any suitable number of repeating units.

As used herein, the term "fracturing fluid" refers to fluids or slurries used downhole during hydraulic fracturing operations.

As used herein, the term "fluid" refers to gases, liquids, gels, slurries with a high solids content, and critical and supercritical materials.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, water control, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

An embodiment described in examples herein provides a hybrid fracturing fluid. The hybrid fracturing fluid includes a mixture of an aqueous copolymer composition including a crosslinkable polymer (CLP), the CLP including crosslinking sites. The mixture also includes a crosslinker for the crosslinking sites, and a friction reducing polymer (FRP).

In an aspect, the CLP, or the FRP, or both, includes 2-acrylamido-2-methylpropane-sulfonic acid monomer units or salts thereof. In an aspect, the hybrid fracturing fluid includes 1 to 20 pounds of the FRP per thousand gallons of the hybrid fracturing fluid. In an aspect, the hybrid fracturing fluid includes about 2 pounds of the FRP per thousand gallons of the hybrid fracturing fluid.

In an aspect, the FRP includes acrylamide monomer units, or 2-acrylamido-2-methylpropane-sulfonic acid monomer units, or both, or salts thereof.

In an aspect, a weight ratio of the crosslinker to the CLP is in a range of 0.01 to 0.8. In an aspect, a weight ratio of the crosslinker to the CLP is in a range of 0.2 to 0.6. In an aspect, the CLP is a synthetic water-soluble polymer including carboxylate groups. In an aspect, the CLP is a polysaccharide. In an aspect, the CLP is a galactomannan. In an aspect, the CLP is a fenugreek gum, a guar gum, a tara gum, a locust bean gum, or a cassia gum, or any combinations thereof.

In an aspect, the hybrid fracturing fluid includes at least one of a gel stabilizer, a clay stabilizer, a viscosity breaker, a proppant, and a pH adjusting agent. In an aspect, the hybrid fracturing fluid includes a pH adjusting agent, wherein a pH of the hybrid fracturing fluid is in a range of 3 to 6.5. In an aspect, the hybrid fracturing fluid includes a pH adjusting agent, wherein a pH of the hybrid fracturing fluid is in a range of 9 to 12.

In an aspect, the hybrid fracturing fluid includes between 50 mg/L and 50,000 mg/L of total dissolved solids.

In an aspect, the crosslinker is a metal, and a concentration of the metal in the hybrid fracturing fluid is in a range of 0.001 wt % to 0.24 wt %. In an aspect, the hybrid fracturing fluid includes 20 to 50 pounds of the CLP per thousand gallons of the fracturing fluid.

Another embodiment described in examples provides a method of treating a subterranean formation. The method includes introducing a hybrid fracturing fluid into the subterranean formation. The hybrid fracturing fluid includes a crosslinkable polymer (CLP) including crosslinkable functional groups, a crosslinker to crosslink the crosslinkable functional groups, and a friction reducing polymer (FRP), wherein the friction reducing polymer does not react with the crosslinker. The method includes crosslinking the crosslinkable polymer.

In an aspect, the CLP, or the FRP, or both includes 2-acrylamido-2-methylpropane-sulfonic acid monomer units. In an aspect, a weight ratio of the crosslinker to the CLP is in a range of 0.01 to 0.8. In an aspect, the method includes adding the FRP as a dry powder after hydrating the CLP. In an aspect, a concentration of the crosslinker in the hybrid fracturing fluid is in a range of 0.001 wt % to 0.24 wt %. In an aspect, the hybrid fracturing fluid includes 20 to 50 pptg of the CLP and 0.5 to 10 pptg of the FRP.

Another embodiment described in examples herein provides a hybrid fracturing fluid. The hybrid fracturing fluid includes a mixture of a crosslinkable polymer including acrylic acid monomer units and a crosslinker including a metal. The hybrid fracturing fluid includes a friction reducing polymer that does not have functionality to react with the crosslinker.

In an aspect, the friction reducing polymer includes acrylamide monomer units.

Other Embodiments

It is to be understood that while embodiments have been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A hybrid fracturing fluid comprising a mixture of:
   an aqueous copolymer composition comprising a crosslinkable polymer (CLP), the CLP comprising crosslinking sites, wherein the CLP comprises 2-acrylamido-2-methylpropane-sulfonic acid monomer units, acrylamide monomer units, and acrylic acid monomer units;
   a crosslinker for the crosslinking sites, wherein a weight ratio of the crosslinker to the CLP is in a range of 0.2 to 0.6; and
   a friction reducing polymer (FRP), wherein increasing the FRP from about 0.5 parts per thousand gallons (pptg) to about 10 pptg decreases the viscosity of the hybrid fracturing fluid by about 23.5% to about 48.6%, as measured at 25 minutes at 100 $s^{-1}$ and 300° F.

2. The hybrid fracturing fluid of claim 1, wherein the CLP, or the FRP, or both, comprises 2-acrylamido-2-methylpropane-sulfonic acid monomer units or salts thereof.

3. The hybrid fracturing fluid of claim 1, comprising 1 to 20 pounds of the FRP per thousand gallons of the hybrid fracturing fluid.

4. The hybrid fracturing fluid of claim 1, comprising about 2 pounds of the FRP per thousand gallons of the hybrid fracturing fluid.

5. The hybrid fracturing fluid of claim 1, wherein the FRP comprises acrylamide monomer units, or 2-acrylamido-2-methylpropane-sulfonic acid monomer units, or both, or salts thereof.

6. The hybrid fracturing fluid of claim 1, wherein a weight ratio of the crosslinker to the CLP is in a range of 0.01 to 0.8.

7. The hybrid fracturing fluid of claim 1, wherein a weight ratio of the crosslinker to the CLP is in a range of 0.2 to 0.6.

8. The hybrid fracturing fluid of claim 1, wherein the CLP is a synthetic water-soluble polymer comprising carboxylate groups.

9. The hybrid fracturing fluid of claim 1, wherein the CLP is a polysaccharide.

10. The hybrid fracturing fluid of claim 9, wherein the CLP is a galactomannan.

11. The hybrid fracturing fluid of claim 10, wherein the CLP is a fenugreek gum, a guar gum, a tara gum, a locust bean gum, or a cassia gum, or any combinations thereof.

12. The hybrid fracturing fluid of claim 1, comprising at least one of a gel stabilizer, a clay stabilizer, a viscosity breaker, a proppant, and a pH adjusting agent.

13. The hybrid fracturing fluid of claim 12, comprising the pH adjusting agent, wherein a pH of the hybrid fracturing fluid is in a range of 3 to 6.5.

14. The hybrid fracturing fluid of claim 12, comprising the pH adjusting agent, wherein a pH of the hybrid fracturing fluid is in a range of 9 to 12.

15. The hybrid fracturing fluid of claim 1, comprising between 50 mg/L and 50,000 mg/L of total dissolved solids.

16. The hybrid fracturing fluid of claim 1, wherein the crosslinker is a metal, and a concentration of the metal in the hybrid fracturing fluid is in a range of 0.001 wt % to 0.24 wt %.

17. The hybrid fracturing fluid of claim 1, wherein the hybrid fracturing fluid comprises 20 to 50 pounds of the CLP per thousand gallons of the hybrid fracturing fluid.

18. A method of treating a subterranean formation, the method comprising:
  introducing a hybrid fracturing fluid into the subterranean formation, the hybrid fracturing fluid comprising an aqueous mixture of:
  a crosslinkable polymer (CLP) comprising crosslinkable functional groups, wherein the CLP comprises 2-acrylamido-2-methylpropane-sulfonic acid monomer units, acrylamide monomer units, and acrylic acid monomer units;
  a crosslinker to crosslink the crosslinkable functional groups, wherein a weight ratio of the crosslinker to the CLP is in a range of 0.2 to 0.6; and
  a friction reducing polymer (FRP), wherein the FRP does not react with the crosslinker, wherein increasing the FRP from about 0.5 parts per thousand gallons (pptg) to about 10 pptg decreases the viscosity of the hybrid fracturing fluid by about 23.5% to about 48.6%, as measured at 25 minutes at 100 s$^{-1}$ and 300° F.; and
  crosslinking the crosslinkable polymer.

19. The method of claim 18, wherein the CLP, or the FRP, or both comprises 2-acrylamido-2-methylpropane-sulfonic acid monomer units.

20. The method of claim 18, wherein a weight ratio of the crosslinker to the CLP is in a range of 0.01 to 0.8.

21. The method of claim 18, comprising adding the FRP as a dry powder after hydrating the CLP.

22. The method of claim 18, wherein a concentration of the crosslinker in the hybrid fracturing fluid is in a range of 0.001 wt % to 0.24 wt %.

23. The method of claim 18, wherein the hybrid fracturing fluid comprises 20 to 50 pptg of the CLP and 0.5 to 10 pptg of the FRP.

* * * * *